UNITED STATES PATENT OFFICE.

JOHANNES C. BOOT, OF KLATTEN, JAVA.

PROCESS OF DECOLORIZING VEGETABLE JUICES.

SPECIFICATION forming part of Letters Patent No. 633,785, dated September 26, 1899.

Application filed February 3, 1899. Serial No. 704,334. (No specimens.)

*To all whom it may concern:*

Be it known that I, JOHANNES C. BOOT, a subject of the Queen of the Netherlands, residing at Klatten, Island of Java, Dutch East Indies, have invented a new and Improved Process of Decolorizing Vegetable Juices, of which the following is a full, clear, and exact description.

This improvement is intended for employment in the art of decolorizing syrups, molasses, and vegetable juices generally. Such syrups, molasses, or other vegetable juices have generally been decolorized with sulphurous acid, (adding sometimes zinc to produce hyposulphurous acid.) It is found in practice, however, that such decolorized juices in a brief time again turn darker, this being due, according to my investigations, to iron salts contained in all juices of the class referred to. These iron salts, under the action of the oxygen contained in the air, cause the juice to become darker and thus interfere with perfect and permanent decolorization.

The object of my present invention is to render the said iron salts innocuous, thus insuring a permanent decolorization.

In carrying out my invention the syrups, molasses, or other vegetable juices of a concentration below 50° Brix are heated to about 50° centigrade and, under constant stirring, sulphurous acid alone or zinc and sulphurous acid are added. So far the process is substantially the usual one. The liquor is then heated to a temperature of, say, 80° centigrade and a soluble ferrocyanide is added till all the iron (or iron and zinc) is precipitated. The liquor is then filtered or decanted in order to free it from the precipitate of ferrocyanide of iron, (and of zinc, in case zinc was used.)

In order to carry my said process into operation, I prefer to proceed as follows: The syrups, molasses, or other vegetable juices are brought to a concentration of about 40° or 50° Brix in a reservoir provided with a stirring apparatus and a steam-heater. The temperature must not exceed 50° centigrade. Under constant stirring zinc is added in quantities varying from five to twenty-five grams per hectoliter and sulphurous acid till a strong acid reaction takes place, this depending, of course, upon the original condition of the juice. It is well known that sulphurous acid in the presence of zinc forms hyposulphurous acid, which is an energetic decolorizer. After the decolorization is finished the reservoir is heated to a temperature ranging from 70° to 95° centigrade, and a soluble ferrocyanide, such as ferrocyanide of potash, is added in sufficient quantity to precipitate the iron and the zinc. The ferrocyanides of iron and of zinc are then separated from the saccharine solution in any suitable manner, such as by filtering. The reaction in this case is a double one, the precipitation of iron (as ferro-ferrocyanide of potassium) and of zinc (as ferrocyanide of zinc) occurring according to the equations

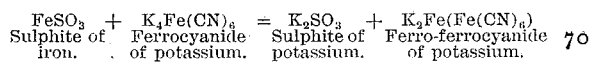

and

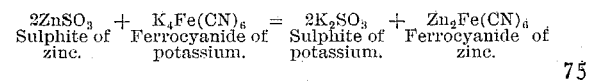

Of course when instead of hyposulphurous acid (produced by the action of sulphurous acid on zinc, as described) only sulphurous acid is employed for the main decolorizing process the precipitation will occur according to the first equation only, since in that case the juice will contain no zinc to be precipitated. The decolorized syrups, molasses, or other vegetable juices are then treated in any approved manner to produce sugar.

I will add by way of further explanation that I prefer to employ ferrocyanide of potash in my process and that the precipitated ferrocyanide may be separated by filter-presses, bag-filters, suction-bags, centrifugal machines, or any apparatus designed to separate solids from liquids.

It will be understood that by my process I remove the iron salts which interfere with decolorization and that the result is a permanent decolorized juice.

Having thus described my invention, I claim as new and desire to secure by Letters Patent—

1. The herein-described improvement in the art of decolorizing syrups, molasses, and other vegetable juices containing iron salts, which consists in treating the saccharine solution with a decolorizing agent until the decolorization is completed, and then precipitating the iron by means of a soluble ferrocyanide, and removing the precipitate, substantially as set forth.

2. The herein-described improvements in the art of decolorizing syrups, molasses, and other vegetable juices containing iron salts, which consists in heating the saccharine solution with sulphurous acid until the decolorization is completed, and then precipitating the iron by means of a soluble ferrocyanide, and removing the precipitate, substantially as set forth.

JOHANNES C. BOOT.

Witnesses:
CJ. SHEKA ARNOLD,
HORA SICCARN.